(12) United States Patent
Kim et al.

(10) Patent No.: US 12,380,317 B2
(45) Date of Patent: Aug. 5, 2025

(54) PROCESSOR FOR RECONSTRUCTING ARTIFICIAL NEURAL NETWORK, ELECTRICAL DEVICE INCLUDING THE SAME, AND OPERATING METHOD OF PROCESSOR

(71) Applicant: SAMSUNG ELECTRONICS CO., LTD., Suwon-si (KR)

(72) Inventors: Kyoungyoung Kim, Suwon-si (KR); Byeoungsu Kim, Hwaseong-si (KR); Jaegon Kim, Hwaseong-si (KR); Changgwun Lee, Hwaseong-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1212 days.

(21) Appl. No.: 17/036,134

(22) Filed: Sep. 29, 2020

(65) Prior Publication Data

US 2021/0264237 A1 Aug. 26, 2021

(30) Foreign Application Priority Data

Feb. 20, 2020 (KR) ........................ 10-2020-0021113

(51) Int. Cl.
*G06N 3/045* (2023.01)
*G06F 3/06* (2006.01)
*G06N 3/082* (2023.01)

(52) U.S. Cl.
CPC ........... *G06N 3/045* (2023.01); *G06F 3/0604* (2013.01); *G06F 3/0659* (2013.01); *G06F 3/068* (2013.01); *G06N 3/082* (2013.01)

(58) Field of Classification Search
None
See application file for complete search history.

(56) References Cited

U.S. PATENT DOCUMENTS 8,924,322 B2 12/2014 Datta et al.
2017/0344881 A1* 11/2017 Okuno ................ G06V 10/764
(Continued)

FOREIGN PATENT DOCUMENTS

KR 10-1940029 B1 1/2019

OTHER PUBLICATIONS

Evaluating the Intrinsic Similarity between Neural Networks; Author: Ashmore (Year: 2015).*
(Continued)

*Primary Examiner* — Mandrita Brahmachari
(74) *Attorney, Agent, or Firm* — Sughrue Mion, PLLC

(57) ABSTRACT

An operation method of a processor configured to operate based on an artificial neural network including a first neural network and a second neural network is provided. The operation method includes: analyzing similarity of a structure of the first neural network and a structure of the second neural network, the first neural network including a plurality of first neural network layers and the second neural network including a plurality of second neural network layers; selecting, from the plurality of first neural network layers and the plurality of second neural network layers, sharing layers capable of being commonly used, based on a result of the analysis; and reconstructing the structure of the first neural network or the structure of the second neural network based on the sharing layers.

15 Claims, 12 Drawing Sheets

(56) References Cited

U.S. PATENT DOCUMENTS

| | | | |
|---|---|---|---|
| 2018/0096249 A1 | 4/2018 | Kim et al. | |
| 2018/0253401 A1 | 9/2018 | Cardinaux et al. | |
| 2018/0276454 A1* | 9/2018 | Han | G06V 40/166 |
| 2019/0026597 A1* | 1/2019 | Zeng | G05D 1/0274 |
| 2019/0244017 A1 | 8/2019 | Tai et al. | |
| 2019/0266387 A1 | 8/2019 | Sun et al. | |
| 2020/0019852 A1 | 1/2020 | Yoon et al. | |
| 2020/0151514 A1* | 5/2020 | Liu | G06V 10/7747 |
| 2020/0167690 A1* | 5/2020 | Zhao | G06F 18/23213 |
| 2020/0210809 A1* | 7/2020 | Kaizerman | G07F 17/3241 |
| 2020/0342285 A1* | 10/2020 | Croxford | G06N 3/045 |
| 2021/0118161 A1* | 4/2021 | Stein | B60W 40/06 |
| 2021/0264237 A1* | 8/2021 | Kim | G06F 3/0604 |
| 2022/0189012 A1* | 6/2022 | Park | G16H 50/20 |

OTHER PUBLICATIONS

Multi-Task Zipping via Layer-wise Neuron Sharing; Author: He et al. (Year: 2018).*
Lui, Wei et al., "SSD: Single Shot MultiBox Detector", arXiv:1512.02325v5 [cs.CV], ECCV, Dec. 29, 2016, pp. 1-17.
Kopuklu, Okan et al., "Convolutional Neural Networks With Layer Refuse", arXiv:1901.09615v2 [cs.CV], Feb. 1, 2019. (5 pages total).
Redmon, Joseph, "YOLOv3 (video)", YouTube, Mar. 25, 2018, https://pjreddie.com/darknet/yolo/. (1 page total).

* cited by examiner

PROCESSOR FOR RECONSTRUCTING ARTIFICIAL NEURAL NETWORK, ELECTRICAL DEVICE INCLUDING THE SAME, AND OPERATING METHOD OF PROCESSOR

CROSS-REFERENCE TO RELATED APPLICATION

This application claims priority from Korean Patent Application No. 10-2020-0021113, filed on Feb. 20, 2020 in the Korean Intellectual Property Office, the disclosure of which is incorporated herein by reference in its entirety.

BACKGROUND

Field

Methods and apparatuses consistent with example embodiments relate to a processor for reconstructing an artificial neural network, and more particularly, to a processor for reconstructing at least one neural network to make a plurality of neural networks include a sharing layer group, an electrical device including the processor, and an operation method of the processor.

Related Art

The artificial neural network may refer to a computing device or a method performed by a computing device to embody clusters of artificial neurons (or neuron models) that are interconnected. The artificial neurons may generate output data by performing simple calculations on input data, and the output data may be transmitted to other artificial neurons. As an example of an artificial neural network, a deep neural network or deep learning may have a multilayered structure.

SUMMARY

One or more example embodiments provide a processor, which determines a sharing layer group that multiple neural networks can commonly use and reconstructs at least one neural network to make the neural networks include the sharing layer group, an electrical device including the processor, and an operation method of the processor.

According to an aspect of an example embodiment, there is provided an operation method of a processor configured to operate based on an artificial neural network including a first neural network and a second neural network. The operation method includes: analyzing similarity of a structure of the first neural network and a structure of the second neural network, the first neural network including a plurality of first neural network layers and the second neural network including a plurality of second neural network layers; selecting, from the plurality of first neural network layers and the plurality of second neural network layers, sharing layers capable of being commonly used, based on a result of the analysis; and reconstructing the structure of the first neural network or the structure of the second neural network based on the sharing layers.

According to an aspect of another example embodiment, there is provided an electrical device including: a memory; and a processor configured to analyze a plurality of first neural network layers of a first neural network and a plurality of second neural network layers of a second neural network; identify a second layer group of the second neural network that has a structure similar to a structure of a first layer group of the first neural network, based on a result of the analysis; generate a reconstructed second neural network by replacing the second layer group of the second neural network with the first layer group; and store the first neural network and the reconstructed second neural network in the memory.

BRIEF DESCRIPTION OF THE DRAWINGS

Example embodiments will be more clearly understood from the following detailed description taken in conjunction with the accompanying drawings in which.

DETAILED DESCRIPTION

Figure 1:
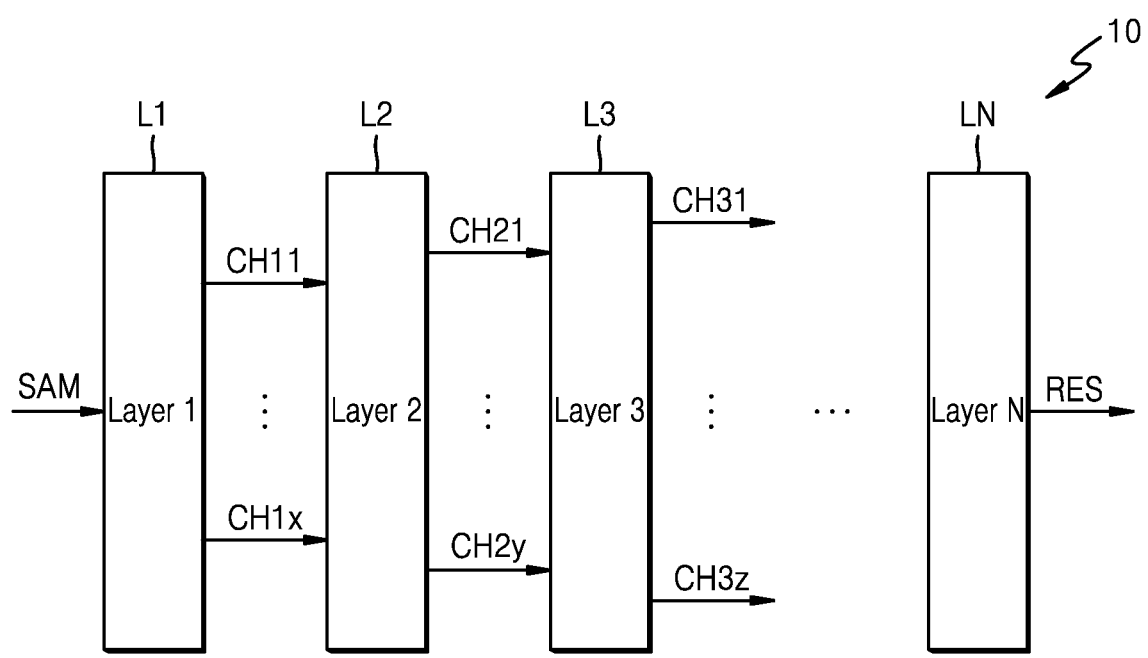
FIG. 1 is a diagram illustrating an artificial network according to an example embodiment.

FIG. 1 is a diagram illustrating an artificial network according to an example embodiment. In detail, FIG. 1 is an example of an artificial neural network (ANN) according to an example embodiment and schematically illustrates a structure of a deep neural network 10.

The ANN may refer to a computing system inspired by biological neural networks that constitute animal brains. The ANN may learn to perform tasks by considering samples (or examples) unlike classical algorithms performing tasks according to predefined conditions such as rule-based programming. The ANN may have a structure in which artificial neurons (or neurons) are connected, and connections between the neurons may be referred to as synapses. The neurons may process received signals and may transmit the processed signals to other neurons through the synapses. An output from a neuron may be referred to as an activation. A neuron and/or a synapse may have a changeable weight, and according to the weight, an effect of a signal processed by the neuron may increase or decrease. A weight of each neuron may be referred to as a bias.

A deep neural network (DNN) or a deep learning architecture may have a layer structure, and an output from a certain layer may be an input to a subsequent layer. In a multi-layered structure, layers may be respectively trained according to samples. The ANN such as the DNN may be realized by processing nodes respectively corresponding to artificial neurons. To obtain results having high accuracy, high computational complexity may be required, and a lot of computing resources may be required accordingly.

Referring to FIG. 1, the DNN 10 may include layers L1, L2, L3, . . . , LN, and an output from a layer may become an input to a subsequent layer though at least one channel. For example, a first layer L1 may provide an output to a second layer L2 through channels CH11 . . . . CH1x by processing a sample SAM, and the second layer L2 may provide an output to a third layer L3 through channels CH21 . . . . CH2y. Finally, an $N^{th}$ layer LN may output a result RES, and the result RES may include at least one value related to the sample SAM. The number of channels to which outputs from the layers L1, L2, L3, . . . , LN are respectively transmitted may be identical to or different. For example, the number of channels CH21 . . . . CH2y of the second layer L2 may be identical to or different from the number of channels CH31 . . . . CH3z of the third layer L3. For example, the second layer L2 may operate based on the output of the first layer L1, received by the second layer L2 through channels CH11 . . . . CH1x. For example, the third layer L3 may operate based on the output of the second layer L2, received by the third layer L3 through channels CH21 . . . . CH2y.

The sample SAM may be input data processed by the DNN 10. For example, the sample SAM may be an image including letters that a person writes with a pen, and the DNN 10 may output a result RES including a value indicating a letter by identifying a letter from the image. The result RES may include probabilities corresponding to different letters, and a letter, which is the most possible from among the letters, may correspond to the highest probability. The layers L1, L2, L3, . . . , LN of the DNN 10 may respectively generate their outputs by processing the sample SAM and an output from a previous layer based on values, for example, weights, biases, etc., which are generated by learning images including letters.

An electrical device may load an ANN to a memory and use the same. As the use of ANNs increases, the number of average ANNs that the electrical device uses also increases. Accordingly, the electrical device has problems such as a limitation in a storage space of a memory and performance degradation according to a use of ANNs.

As described below with reference to the attached drawings, an electrical device according to example embodiments may determine a layer group that the neural networks may commonly use and may reconstruct at least one neural network to make the neural networks include the determined layer group. When the neural networks including the reconstructed neural networks are stored, the electrical device may store only once a layer group that the neural networks may commonly use, thus decreasing a storage space assigned to the neural networks.

Figure 2:
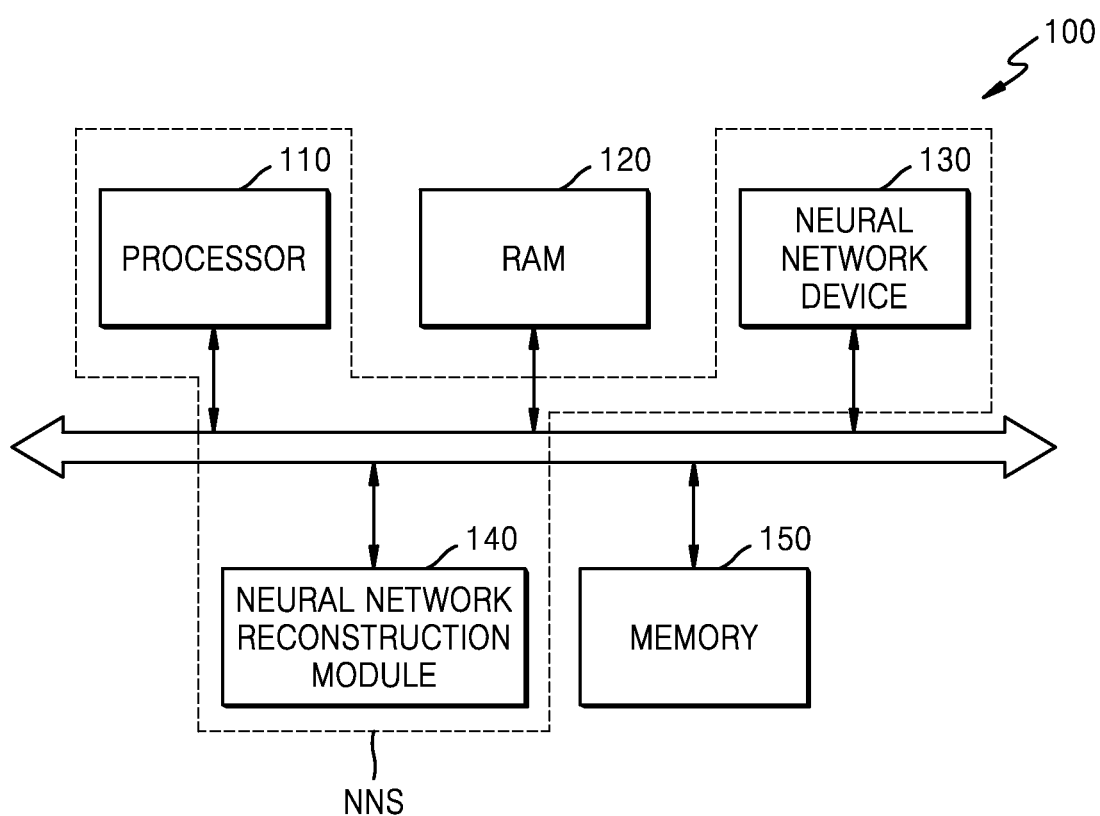
FIG. 2 is a diagram illustrating a structure of an electrical device according to an example embodiment.

FIG. 2 is a diagram illustrating a structure of an electrical device according to an example embodiment.

Referring to FIG. 2, an electrical device 100 may include a processor 110, random access memory (RAM) 120, a neural network device 130, a neural network reconstruction module 140, and a memory 150. In an example embodiment, at least one of components of the electrical device 100 may be mounted on one semiconductor chip.

The electrical device 100 may extract effective information by analyzing, in real time, input data based on the ANN and may determine a situation based on the extracted information or control configurations mounted on the electrical device 100. The electrical device 100 may include an application processor (AP) included in a mobile device. Alternatively, the electrical device 100 include a computing system, a robotic device such as a drone or an advanced drivers assistance system (ADAS), a smart TV, a smart phone, a medical device, a mobile device, an image display device, a measurement device, an Internet of Things (IoT) device, or the like, and the electrical device 100 may be applied to other devices.

The electrical device 100 may include a neural network system NNS and may perform a calculation of the ANN. The neural network system NNS may include at least some of the configurations of the electrical device 100 with regard to a neural network operation. FIG. 2 illustrates that the neural network system NNS includes the processor 110, the neural network device 130, and the neural network configuration module 140, but example embodiments are not limited thereto. For example, various types of configurations related to the neural network operation may be included in the neural network system NNS.

The processor 110 may control all operations of the electrical device 100. The processor 110 may include a single core or multiple cores. The processor 110 may process or execute programs and/or data stored in the memory 150. In an example embodiment, the processor 110 may execute the programs stored in the memory 150 and thus control a function of the neural network device 130.

The RAM 120 may temporarily store programs, data, or instructions. For example, the programs and/or the data stored in the memory 150 may be temporarily stored in the RAM 120 according to control or booting code of the processor 110. The RAM 120 may be embodied as a memory such as dynamic RAM (DRAM) or static RAM (SRAM). The memory 150 may be embodied as a non-volatile memory such as a flash memory.

The neural network device 130 may perform a calculation of the ANN based on received input data and may generate output data based on a calculation result. Models of the ANN may include various types of models such as Convolutional Neural Networks (CNN), Recurrent Neural Networks (RNN), Deep Belief Networks, and Restricted Boltzman Machines, but example embodiments are not limited thereto. The neural network device 130 may include at least one processor (e.g., an exclusive processor) for performing calculations according to the ANNs. Also, the neural network device 130 may include a separate memory for storing programs corresponding to the ANNs.

The neural network reconstruction module 140 according to an example embodiment may generate a reconstructed neural network by using an input neural network. In an example embodiment, the neural network reconstruction module 140 may receive and analyze the neural networks and thus determine a layer group (hereinafter, referred to as a sharing layer group) that the neural networks may commonly use. The neural network reconstruction module 140 may reconstruct at least one neural network to make the determined layer group be included in the neural networks.

For example, when a first neural network and a second neural network are input, the neural network reconstruction module 140 may analyze the first and second neural networks and determine a first layer group included in the first neural network as a sharing layer group. The neural network reconstruction module 140 may reconstruct the second neural network to make the second neural network include the first layer group.

The neural network reconstruction module 140 may reconstruct the input neural network to ensure that the input neural network and the reconstructed neural network are used to generate an identical output sample with regard to one input sample. That is, the neural network reconstruction module 140 may change a layer structure of the input neural network and change a weight of at least one layer of the input neural network to generate an identical calculation result before the reconstruction. A specific operation in which the neural network reconstruction module 140 reconstructs the neural network will be described with reference to FIGS. 3 to 6.

The neural network reconstruction module 140 may store the neural network in the RAM 120 or the memory 150. In an example embodiment, the neural network reconstruction module 140 may store, in the RAM 120 or the memory 150, layer groups respectively constructing neural networks including the reconstructed neural networks. Because the neural networks output from the neural network reconstruction module 140 all include the sharing layer group due to the reconstruction operation of the neural network reconstruction module 140, the sharing layer group may be stored in the RAM 120 or the memory 150 only once. For example, the sharing layer group may be stored in the RAM 120 for a rapid calculation using a neural network, and the other layer groups may be stored in the memory 150.

As described above, the electrical device according to an example embodiment may reconstruct at least one neural network to make neural networks include the sharing layer group and may not store layer groups that overlap, thus reducing a storage space where the neural networks are stored. Also, the electrical device according to an example embodiment may store the sharing layer group in the RAM 120, in which a rapid reading operation is possible, and thus may quickly start a calculation when neural networks are used. Also, the electrical device according to an example embodiment may prevent a decrease in the accuracy according to the reconstruction of the neural network by performing relearning of the reconstructed neural network to generate the same calculation result as the calculation result of the neural network before the reconstruction.

Figure 3:
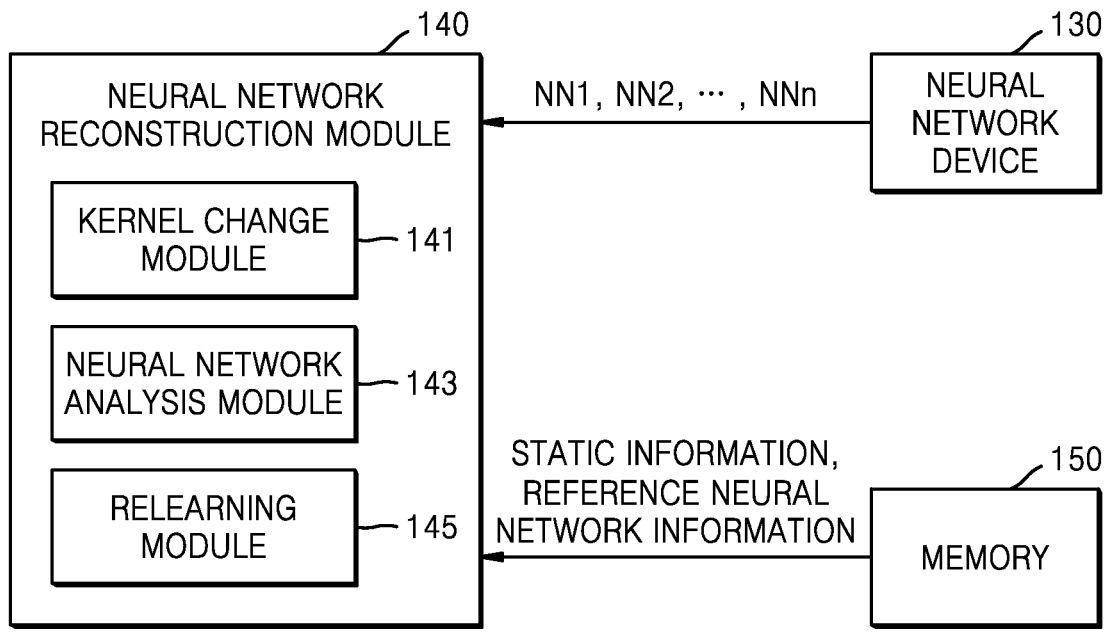
FIG. 3 is a diagram illustrating a specific structure of a neural network reconstruction module, according to an example embodiment.

FIG. 3 is a diagram illustrating a specific structure of a neural network reconstruction module, according to an example embodiment. In detail, FIG. 3 illustrates a specific structure of the neural network reconstruction module 140 of FIG. 2. The neural network reconstruction module 140 may include a kernel change module 141, a neural network analysis module 143, and a relearning module 145.

Referring to FIGS. 2 and 3, the neural network reconstruction module 140 may receive neural networks NN1, NN2, . . . , and NNn from the neural network device 130. The neural network reconstruction module 140 may analyze structures of the neural networks NN1, NN2, . . . , and NNn and may reconstruct at least one of the neural networks NN1, NN2, . . . , and NNn.

The neural network reconstruction module 140 may receive static information and reference neural network information from the memory 150 to perform the reconstruction operation. The static information may include basic information of various configurations included in the electrical device 100 and may include, for example, computing resource information such as hardware performance and attributes which are used to execute the ANN. The reference neural network information is information referenced during analysis of a neural network architecture and may include, for example, information regarding architectures of neural networks that are frequently used or representative among the ANNs.

The kernel change module 141 of the neural network reconstruction module 140 may change a kernel size of the received neural network. In an example embodiment, the kernel change module 141 may determine whether performance of the electrical device 100 is appropriate for operation of the received neural network based on the static information of the electrical device 100 and may change a kernel size of the neural network according to a determination result. An operation of changing the kernel size of the kernel change module 141 may include the relearning operation of the neural network having the changed kernel size.

For example, the kernel change module 141 may determine that the performance of the electrical device 100 is appropriate for operation of a neural network having a kernel size of 5×5, but the received neural network may have a kernel size of 7×7. The kernel change module 141 may change, to 5×5, a kernel size of the received neural network to make it appropriate for the performance of the electrical device 100 and may then perform relearning of the neural network.

When receiving the neural networks NN1, NN2, . . . , and NNn from the neural network device 130, the kernel change module 141 may identify a neural network that is inappropriate for the performance of the electrical device 100 from among the neural networks NN1, NN2, . . . , and NNn and may change a kernel size of the identified neural network. The kernel change module 141 may transmit the neural networks NN1, NN2, . . . , and NNn to the neural network analysis module 143 when a kernel size change operation is completed.

The neural network analysis module 143 of the neural network reconstruction module 140 may analyze structures of the neural networks NN1, NN2, . . . , and NNn and determine a layer group that the neural networks NN1, NN2, . . . , and NNn may commonly use. In an example embodiment, the neural network analysis module 143 may analyze the structures of the neural networks NN1, NN2, . . . , and NNn based on the reference neural network information received from the memory 150 and may identify layer groups having similar structures from among layer groups forming the neural networks NN1, NN2, . . . , and NNn. The neural network analysis module 143 may determine, as the sharing layer group, one of the layer groups having the similar structures. An operation in which the neural network analysis module 143 determines the sharing layer group will be described in detail with reference to FIG. 4. The neural network analysis module 143 may provide a result of the analysis to the relearning module 145. A result of the analysis may include, for example, information regarding the layer groups of the neural networks NN1, NN2, . . . , and NNn that are identified to have the similar structures, and information regarding the sharing layer group.

The relearning module 145 of the neural network reconstruction module 140 may reconstruct at least one neural network to make the neural networks NN1, NN2, . . . , and NNn include the sharing layer group and then may perform the relearning. In an example embodiment, the relearning module 145 may identify a neural network that does not include the sharing layer group from among the neural networks NN1, NN2, . . . , NNn based on the received result of the analysis. The relearning module 145 may reconstruct the identified neural network so the identified neural network includes the sharing layer group and perform the relearning of the reconstructed neural network.

For example, the relearning module 145 may identify that the first neural network NN1 includes the sharing layer group, but the second neural network NN2 does not include the sharing layer group (e.g., a first layer group). The relearning module 145 may identify a layer group (e.g., a second layer group) that is similar to the sharing layer group from among the layer groups forming the second neural network NN2 and may replace at least part of the second layer group with the first layer group. The relearning module 145 may add at least one layer in addition to the replaced group of the second neural network NN2. The relearning module 145 may perform relearning on the added at least one layer to enable a calculation result of the second layer group before the reconstruction to be identical to a calculation result of the second layer group after the reconstruction. The first neural network NN1 already includes the sharing layer group, and thus, the relearning module 145 may not perform a reconstruction operation on the first neural network NN1.

When the relearning operation is completed, the relearning module 145 may store, in the RAM 120 or the memory 150, the neural networks NN1, NN2, . . . , and NNn including the reconstructed at least one neural network. In this case, the relearning module 145 may store the neural networks NN1, NN2, . . . , and NNn in a layer group unit. For example, when the first neural network NN1 includes first to third layer groups, the relearning module 145 may store each of the first to third layer groups and may store the layer groups in the same storage space or different storage spaces.

The relearning module 145 may store the neural networks NN1, NN2, . . . , and NNn in a layer unit, and the sharing layer group may be stored only once. When receiving an operation request, the neural network device 130 may identify layer groups forming neural networks required for the operation and may read layer groups identified from the RAM 120 or the memory 150. The neural network device 130 may perform a neural network calculation using the read layer groups.

The kernel change module 141, the neural network analysis module 143, and the relearning module 145 may each be realized as a logic block embodied through logic synthesis, a software block processed by a processor (such as a hardware processor), or a combination thereof. In an example embodiment, the kernel change module 141, the neural network analysis module 143, and the relearning module 145 may include a collection of instructions executed by the processor 110 and may be stored in the memory 150.

Figure 4:
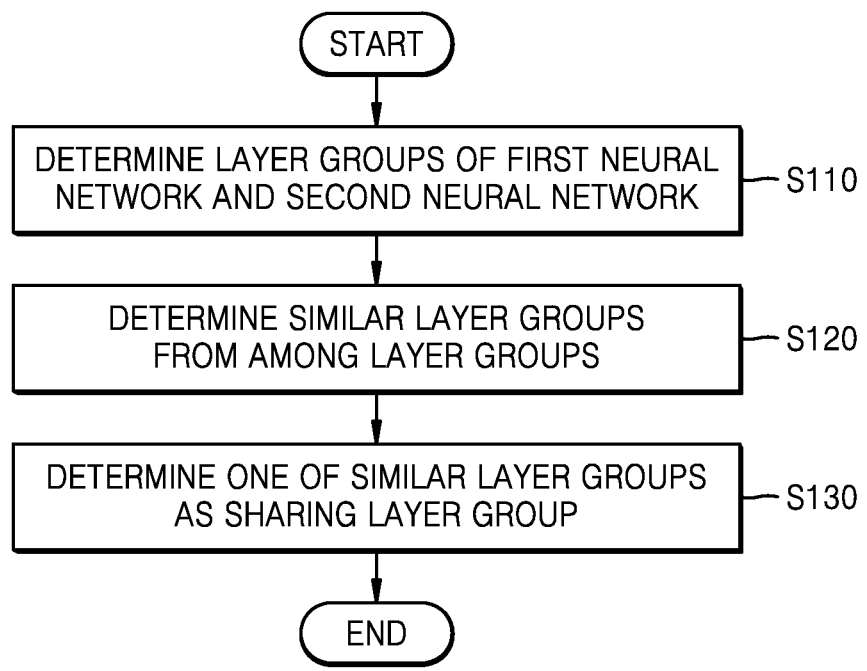
FIG. 4 is a flowchart of a method of determination of a sharing layer group according to an example embodiment.

FIG. 4 is a flowchart of a method of determining a sharing layer group according to an example embodiment. In detail, FIG. 4 is a flowchart of a method of determining the sharing layer group of the neural network analysis module 143 of FIG. 3. Hereinafter, it is assumed that a first neural network and a second neural network are input to the neural network analysis module 143.

Referring to FIGS. 3 and 4, in operation S110, the neural network analysis module 143 may determine layer groups forming the first neural network and the second neural network. In an example embodiment, the neural network analysis module 143 may identify layers having structure similar to a structure of a reference numeral network from among the layers forming the first and second neural networks, based on reference neural network information, and may determine the identified layers as one group. For example, a first reference neural network may include two convolution layers and a pooling layer from among reference neural networks. When identifying that the input first neural network has a structure in which two layers and a pooling layer are continuous, the neural network analysis module 143 may determine the identified layers as one layer group. The neural network analysis module 143 may repeatedly perform the above-described operation on other layers of the first neural network. In this regard, the neural network analysis module 143 may identify additional layer groups of the first neural network In an operation of identifying the layers having the structure similar to the structure of the reference neural network, it has been described that the similarities of structures are determined based on a type of a layer such as a convolution layer or a pooling layer, but example embodiments are not limited thereto. For example, the neural network analysis module 143 may identify the layers having the similar structures by considering types of layers of a reference neural network, the number of layers, a kernel size, the number of input samples, the number of output samples, and the like.

In operation S120, the neural network analysis module 143 may determine similar layer groups from among layer groups of the first and second neural networks. In an example embodiment, the neural network analysis module 143 may determine similar layer groups (hereinafter, referred to as a similar group) from among the layers, based on the reference neural network referenced in the operation of determining the groups of the first and second neural networks (S110).

For example, when the neural network analysis module 143 identifies layers having structure similar to the structure of the first reference neural network and determines the identified layers as the first layer group of the first neural network and the second layer group of the second neural network, the neural network analysis module 143 may determine the first and second layer groups as a first similar group. Also, when the neural network analysis module 143 identifies layers having structure similar to the structure of the second reference neural network and determines the identified layers as a third layer group of the first neural network and a fourth layer group of the second neural network, the neural network analysis module 143 may determine the third and fourth layer groups as a second similar group.

A method whereby the neural network analysis module 143 determines similar layer groups from among layer groups is not limited to the above method. For example, the neural network analysis module 143 may determine similar layer groups by directly comparing the layer groups. For example, the neural network analysis module 143 may identify layers having similar structures by considering types and the number of respective layers of the layer groups, a kernel size, the number of input samples, the number of output samples, and the like.

In operation S130, the neural network analysis module 143 may determine one of the similar layer groups as a sharing layer group of the first and second neural networks. In an example embodiment, the neural network analysis module 143 may determine, as the sharing layer group, a layer group that has a structure most similar to a structure of the reference neural network corresponding to similar layer groups. For example, when the neural network analysis module 143 may determine, as the sharing layer group, the first layer group that has a structure most similar to a structure of the first reference neural network from among the first layer group of the first neural network and the second layer group of the second neural network.

In another example embodiment, the neural network analysis module 143 may determine, as a sharing layer group, a layer group having the greatest performing or a high efficiency of storage space from among similar layer groups. For example, the neural network analysis module 143 may determine, as the sharing layer group, the second layer group of the second neural network having excellent performance from among the first layer group of the first neural network and the second layer group of the second neural network. The layer group having excellent performance may mean a layer group capable of performing an operation with a smaller number of nodes or layers, but the present disclosure is not limited thereto, and the degree of performance may be determined based on various criteria. A method of sharing one of similar layer groups as a sharing layer group is not limited to the method described above and may vary.

Figure 5:
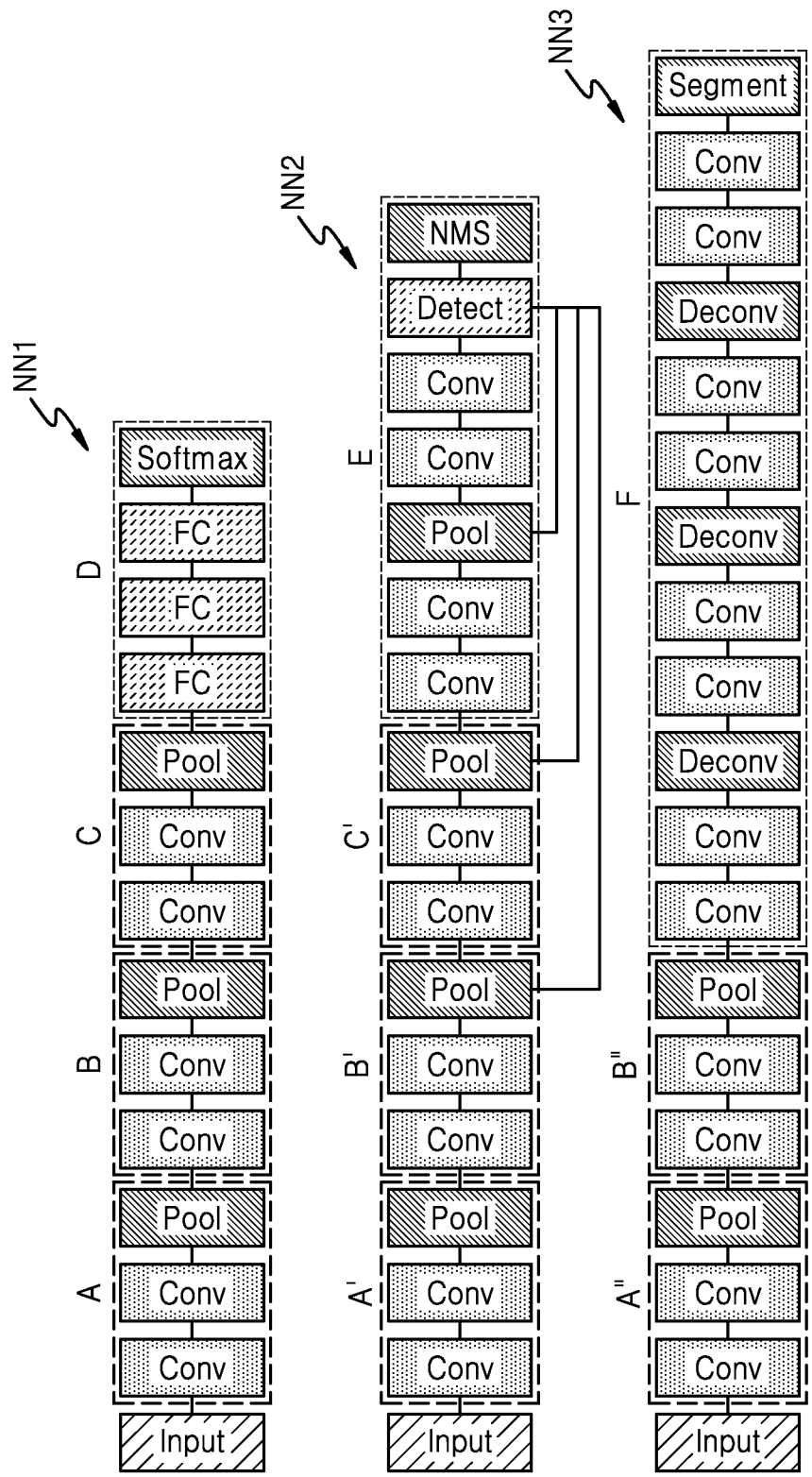
FIG. 5 is a diagram for explaining a neural network analysis operation according to an example embodiment.

FIG. 5 is a diagram for explaining a neural network analysis operation according to an example embodiment. In detail, FIG. 5 is a diagram for explaining an operation in which the neural network analysis module 143 of FIG. 3 analyzes the first to third neural networks NN1 to NN3.

Referring to FIGS. 3 and 5, the neural network analysis module 143 may determine layer groups forming the first to third neural networks NN1 to NN3 based on the reference neural network information. The first to third neural networks NN1 to NN3 may include different layers, such as convolution layers (Conv), deconvolution layers (Deconv), pooling layers (Pool), Fully Connected (FC) layers, Softmax layers normalizing input data and Non-Maximum Suppression (NMS) layers. For example, referring to FIG. 5, the neural network analysis module 143 may group layers having structures that are respectively similar to those of reference neural networks from among the layers of the first neural network NN1, and thus may determine layer groups of the first neural network NN1. For example, as shown in FIG. 5 the first neural network NN1 includes groups A, B, C and D. Also, the neural network analysis module 143 may group layers having structure similar to structures of reference neural networks from among the layer forming the second neural network NN2 and thus may determine layer groups of the second neural network NN2. For example, as shown in FIG. 5, the second neural network NN2 includes groups A', B', C' and E. Also, the neural network analysis module 143 may group layers having structure similar to structures of reference neural networks from among the layer forming the third neural network NN3 and thus may determine layer groups of the third neural network NN3. For example, the third neural network NN3 includes groups A", B" and F.

The neural network analysis module 143 may identify similar groups from among the layer groups of the first to third neural networks NN1 to NN3 and may determine the identified layer groups as a similar group. For example, referring to FIG. 5, the neural network analysis module 143 may determine, as a first similar group, the group A of the first neural network NN1, the group A' of the second neural network NN2, and the group A" of the third neural network NN3 which are formed by grouping layers having structure similar to the structure of the first reference neural network. Also, the neural network analysis module 143 may determine, as a second similar group, the group B of the first neural network NN1, the group B' of the second neural network NN2, and the group B" of the third neural network NN3 which are formed by grouping the layers having structure similar to the structure of the second reference neural network. The neural network analysis module 143 may determine, as a third similar group, the group C of the first neural network NN1, the group C' of the second neural network NN2 that are formed by grouping the layers having structure similar to a structure of the fourth reference neural network.

The neural network analysis module 143 may determine a sharing layer group regarding each similar group. For example, referring to FIG. 5, the neural network analysis module 143 may determine, as a sharing layer group, the group A of the first neural network NN1 with regard to the first similar group. Also, the neural network analysis module 143 may determine, as a sharing layer group, the group B of the first neural network NN1 with regard to the second similar group. Also, the neural network analysis module 143 may determine, as a sharing layer group, the group C of the first neural network NN1 with regard to the third similar group. A method of determining a sharing layer group may be substantially the same as the method described with reference to FIG. 4, and thus its descriptions will be omitted.

Figure 6:
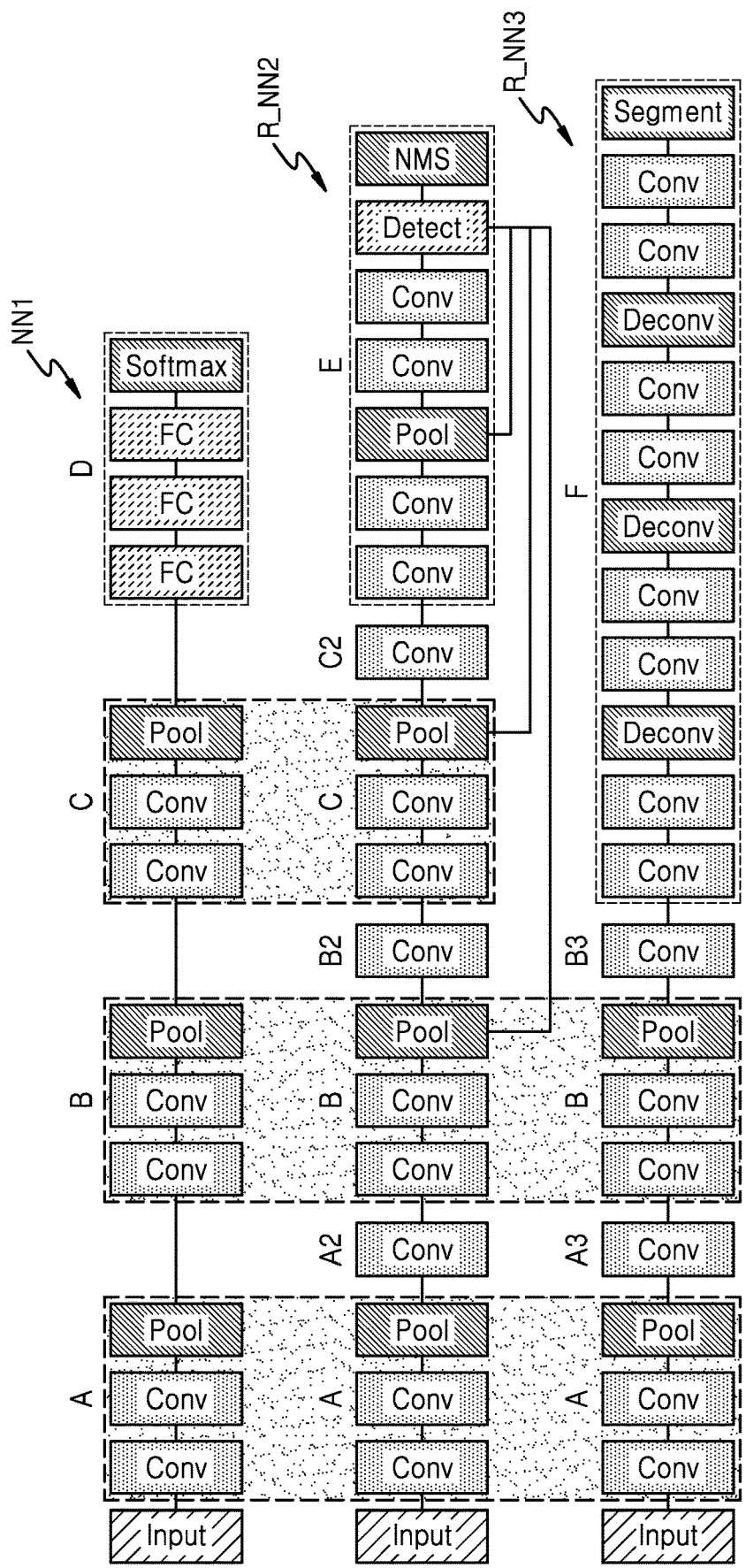
FIG. 6 is a diagram for explaining a neural network reconstruction operation according to an example embodiment.

FIG. 6 is a diagram for explaining a neural network reconstruction operation according to an example embodiment. In detail, FIG. 6 is a diagram for explaining an operation in which the relearning module 145 of FIG. 3 reconstructs the first to third neural networks NN1 to NN3 of FIG. 5.

Referring to FIGS. 3, 5 and 6, the relearning module 145 may reconstruct a layer group that is included in the similar group but is not in the sharing layer group. For example, referring to FIG. 6, the group A of the first neural network NN1, the group A' of the second neural network NN2 and the group A" of the third neural network NN3 are included in the first similar group. However, the group A of the first neural network NN1 is the sharing layer group of the first similar group. Thus, the relearning module 145 may reconstruct the group A' of the second neural network NN2 and the group A" of the third neural network NN3. The relearning module 145 may replace the group A' of the second neural network NN2 and the group A" of the third neural network NN3 with the group A. The relearning module 145 may add a new layer (a group A2) in addition to the group A replacing the second neural network NN2, and may generate a reconstructed second neural network R_NN2 by performing relearning to make calculation results be identical before/after the reconstruction. The relearning module 145 may add a new layer (a group A3) in addition to the group A that replaces the third neural network NN3, and may generate a reconstructed third neural network R_NN3 by performing relearning to make calculation results be identical before/after the reconstruction. The relearning module 145 may identically perform the above operations on the layers included in the second similar group and the third similar group.

Figure 7:
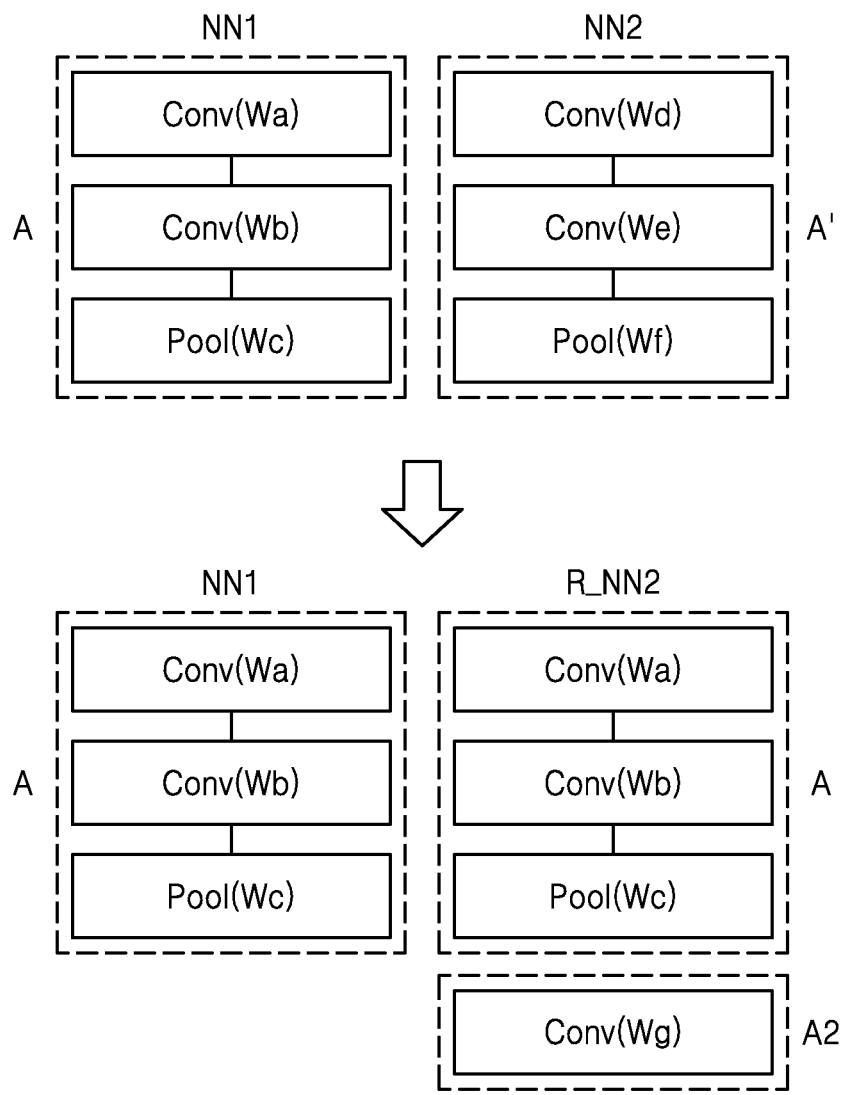
FIG. 7 is a diagram for explaining a relearning operation according to an example embodiment.

FIG. 7 is a diagram for explaining a relearning operation according to an example embodiment. In detail, FIG. 7 is a diagram for explaining a relearning operation of the first neural network NN1 of FIG. 5 performed by the relearning module 145 of FIG. 3.

Referring to FIG. 7, the group A of the first neural network NN1 may include a convolution layer Conv(Wa) having a weight Wa, a convolution layer Conv(Wb) having a weight Wb, and a pooling layer Pool(Wc) having a weight Wc, and the group A' of the second neural network NN2 may include a convolution layer Conv(Wd) having a weight Wd, a convolution layer Conv(We) having a weight We, and a pooling layer Pool(Wf) having a weight Wf.

Because the sharing layer group of the first similar group including the group A and the group A' is the group A, the relearning module 145 may replace the group A' of the second neural network NN2 with the group A. In this case, the relearning module 145 may replace the group A' of the second neural network NN2 without a change in types and weights of the layers of the group A. The relearning module 145 may add the new layer (the group A2). The relearning module 145 may determine a type of the new layer (the group A2) to make the calculation results be identical before/after the reconstruction of the second neural network NN2. For example, referring to FIG. 7, the relearning module 145 may determine the type of the new layer (group A2) as a convolution layer so that the calculation result before/after reconstruction is the same. The relearning module 145 may determine a weight of the new layer (the group A2) through the relearning performed on the new layer (the group A2).

That is, referring to FIG. 7, the relearning module 145 may determine the weight Wg of the new layer (the group A2) through relearning to make the calculation result using the convolution layers Conv(Wd) and Conv(We) and the pooling layer Pool(Wf) be identical to the calculation result using the convolution layers Conv(Wa), Conv(Wb), and the pooling layer Pool(Wc), and a convolution layer Conv(Wg).

Accordingly, when storing the first neural network NN1 and the second neural network NN2, the relearning module 145 may store the groups A and A2 (that is, store four layers in total) instead of storing the groups A and A' (that is, storing six layers in total).

Figure 8:
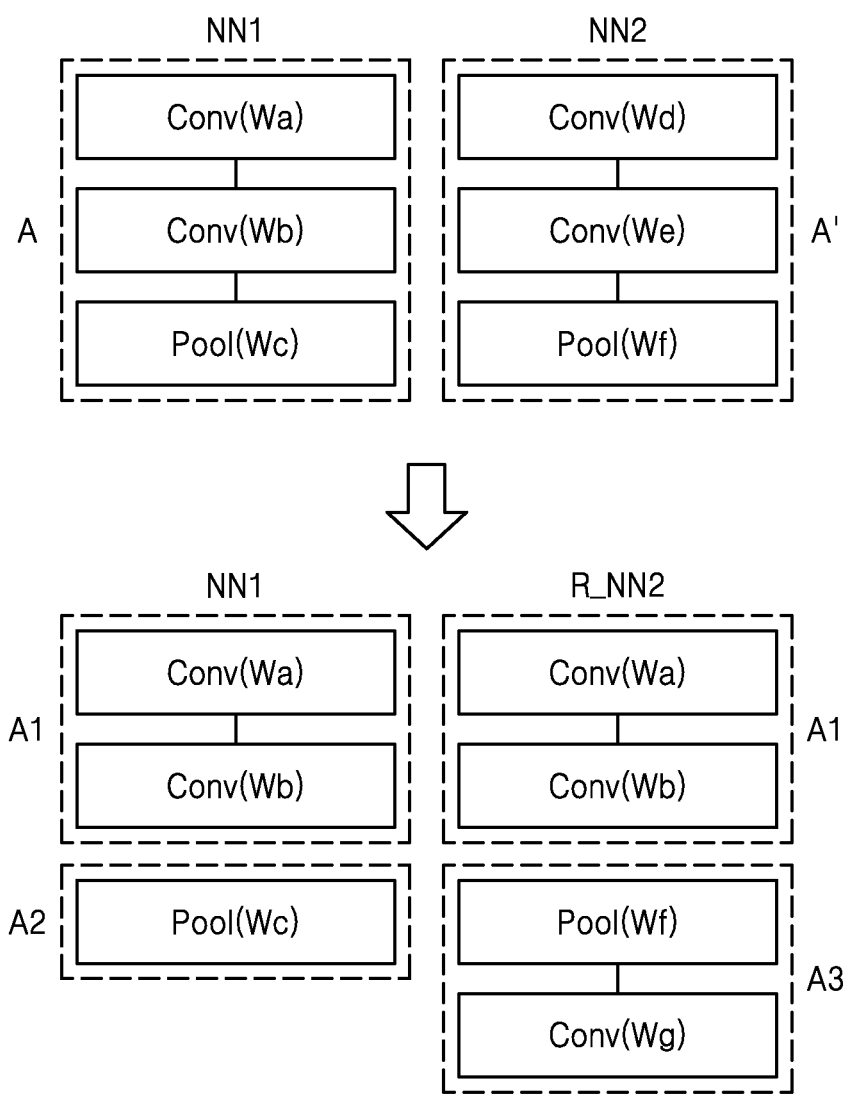
FIG. 8 is a diagram for explaining a relearning method according to an example embodiment.

FIG. 8 is a diagram for explaining a relearning method according to an example embodiment. The relearning method of FIG. 8 is a modification of the example embodiment of FIG. 7.

As discussed above neural network analysis module 143 of FIG. 3 may determine one of the similar layer groups as the sharing layer group, but example embodiments are not limited thereto. According to an example embodiment, the neural network analysis module 143 may determine at least part of one of the similar layer groups as the sharing layer group. For example, referring to FIG. 8, the neural network analysis module 143 may determine the group A1 (Conv (Wa) and Conv(Wb)), which is part of the group A, as the sharing layer group of the first similar group that includes the groups A and A'.

Therefore, the relearning module 145 may replace layers corresponding to the group A1 from among layers of the group A' of the second neural network NN2, with the group A1. For example, referring to FIG. 8, the relearning module 145 may replace the layers (Conv(Wd) and Conv(We)) of the second neural network NN2 that correspond to the group A1 (Conv(Wa) and Conv(Wb)) with the group A1 (Conv (Wa) and Conv(Wb)).

The relearning module 145 may generate a new group A3 by adding the new layer to the layer (Pool(Wf)) that is not replaced in the existing group A'. The relearning module 145 may determine a type of the new layer to make the calculation results be identical before/after the reconstruction of the second neural network NN2. For example, referring to FIG. 8, the relearning module 145 may determine the type of the new layer as a convolutional layer so that the calculation result before/after reconstruction is the same. The relearning module 145 may determine a weight of the new layer (Conv(Wg)) through the relearning on the new layer (Conv(Wg)).

Because the first neural network NN1 includes the sharing layer group A1, the relearning module 145 may not reconstruct the first neural network NN1 but may separate the groups A and A1 of the first neural network NN1 from other layers. For example, referring to FIG. 8, the relearning module 145 may separate the group A (Conv(Wa), Conv (Wb), Pool(Wc)) from the group A1 (Conv(Wa), Conv(Wb)) and the group A2 (Pool(Wc)). Accordingly, when storing the first neural network NN1 and the second neural network NN2, the relearning module 145 may store the groups A1, A2, and A3 (that is, store five layers in total) instead of storing the groups A and A' (that is, storing six layers in total).

Figure 9:
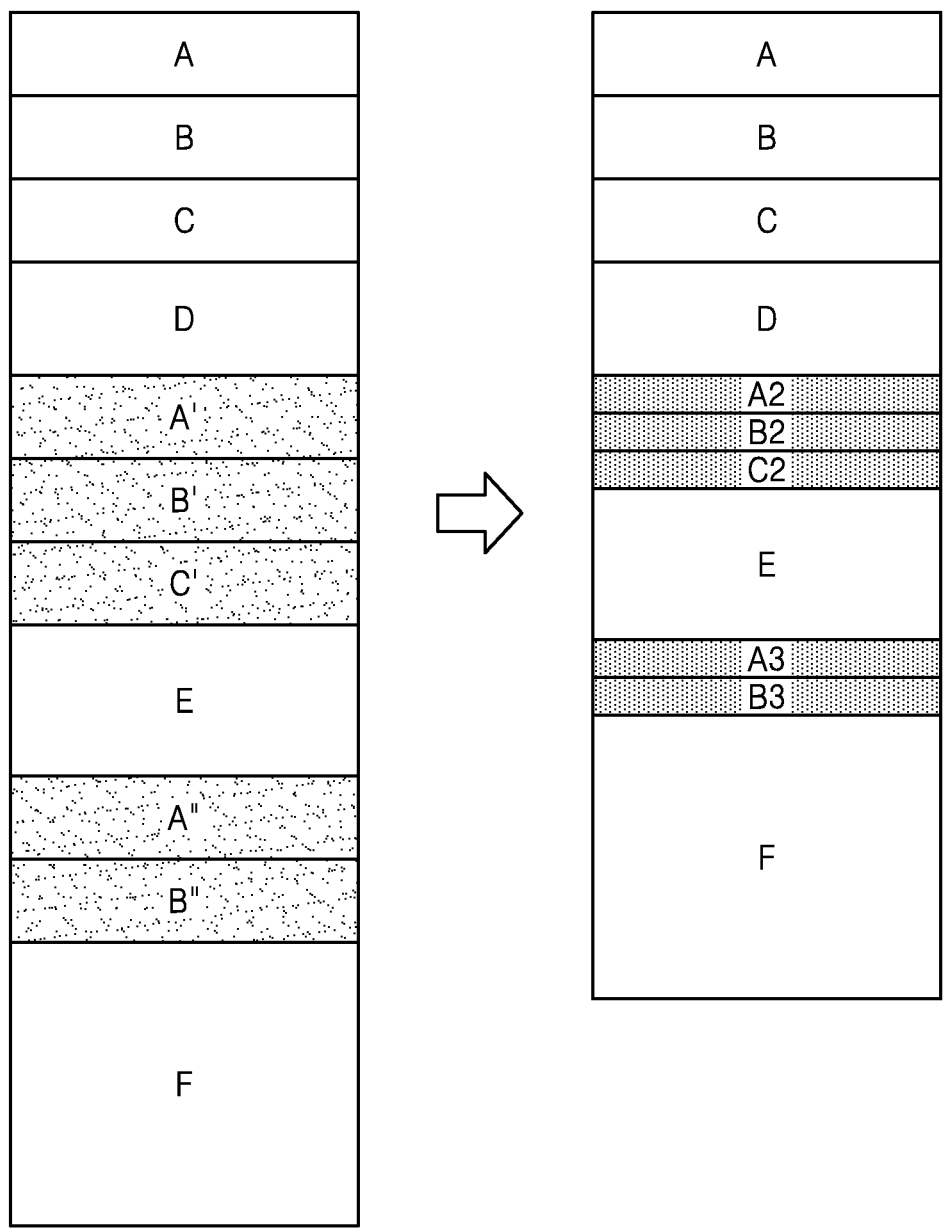
FIG. 9 is a diagram of a storage space before and after neural network reconstruction, according to an example embodiment.

FIG. 9 is a diagram of a storage space before and after neural network reconstruction, according to an example embodiment. In detail, FIG. 9 is a diagram illustrating the (first to third) neural networks NN1 to NN3 of FIG. 5 and storage spaces of the neural networks NN1, R_NN2, and R_NN3 of FIG. 6.

Referring to FIGS. 5, 6, and 9, before the reconstruction of the neural network, because the (first to third) neural networks NN1 to NN3 do not include the layer group that overlap, the electrical device 100 may store all layer groups forming the (first to third) neural networks NN1 to NN3 in the storage space. For example, referring to FIG. 9, the electrical device 100 may store, in the storage space, all layer groups (the groups A, B, C, and D) forming the first neural network NN1, all layer groups (the groups A', B', C', and E) forming the second neural network NN2, and all layer groups (the groups A", B", and F) forming the third neural network NN3.

After the reconstruction of the neural network, because the neural networks NN1, R_NN2, and R_NN3 include the overlapping layer group (that is, the sharing layer group), the electrical device 100 may store overlapping layer groups only once and the rest of layer groups that do not overlap in the storage space. For example, referring to FIG. 9, the electrical device 100 may store the layer groups (the groups A, B, C, and D) forming the first neural network NN1, the layer groups (the groups A2, B2, C2, and E) forming the second neural network NN2 except for the groups A, B, and C that are the sharing layer group, and the layer groups (the groups A3, B3, and F) forming the third neural network NN3 except for the groups A and B that are the sharing layer group.

After the reconstruction of the neural network of the electrical device 100, the sharing layer group may be stored only once, and thus, the efficiency of the storage space of the electrical device 100 may increase. Due to the layer added during the reconstruction of the neural network, the efficiency increase in the storage space may be partly reduced, but a storage space (that is, the storage space of FIG. 9 assigned to the groups A', B', C', A", and B"), which decrease due to the sharing layer group, is greater than a storage space (that is, the storage space of FIG. 9 assigned to the groups A2, B2, C2, A3, and B3), which increases due to the added layer. Thus, the overall efficiency of the storage space of the electrical device 100 may increase.

Figure 10:
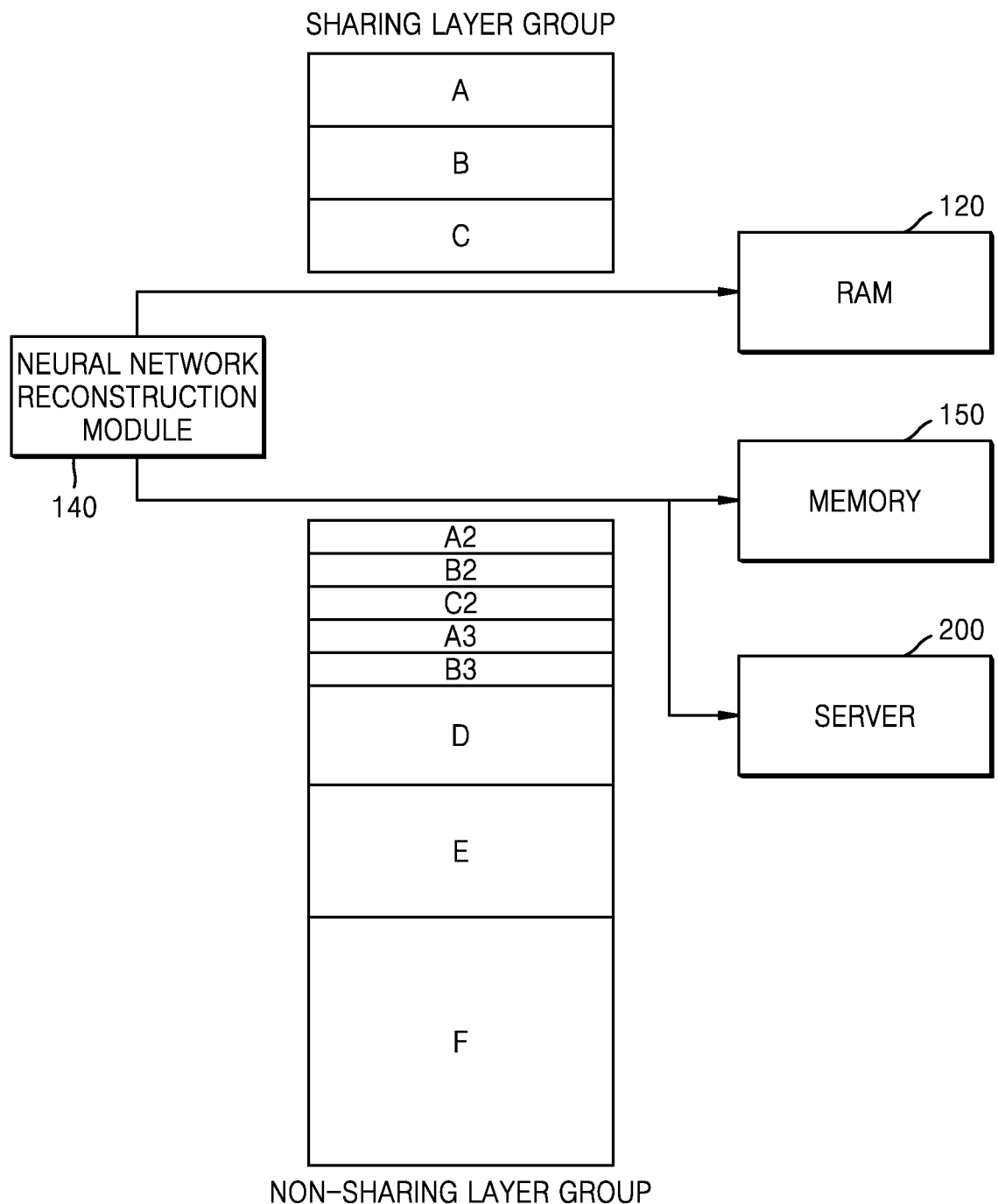
FIG. 10 is a diagram for explaining a neural network storage method, according to an example embodiment.

FIG. 10 is a diagram for explaining a neural network storage method, according to an example embodiment. In detail, FIG. 10 is a diagram for explaining a method whereby the neural network reconstruction module 140 of FIG. 2 stores layer groups forming a neural network.

Referring to FIGS. 2 and 10, the neural network reconstruction module 140 may store the neural networks in the storage space when the neural network reconstruction operation is completed. In an example embodiment, the neural network reconstruction module 140 may store, in separate storage spaces, sharing layer groups and non-sharing layer groups from among layer groups forming the neural network. For example, the neural network reconstruction module 140 may store the sharing layer groups in the RAM 120 and store the non-sharing layer groups in the memory 150 or a server 200 outside the electrical device 100.

As the sharing layer groups are stored in the RAM 120, when the neural network device 130 performs a calculation via the neural network, the neural network device 130 may start the calculation by quickly reading the sharing layer group from the RAM 120. The neural network device 130 may perform a calculation by using the read sharing layer group and may simultaneously read other non-sharing layer groups from the memory 150 or receive other non-sharing layer groups from the server 200, thus preparing a next calculation. The neural network device 130 may perform a calculation using the non-sharing layer group when the calculation using the sharing layer group is completed and thus may decrease a time taken to perform the calculation. As described, the electrical device 100 according to an example embodiment may effectively store the neural networks and may also have good performance.

A method whereby the neural network reconstruction module 140 stores the layer groups is not limited thereto. For example, the neural network reconstruction module 140 may store the sharing layer group in the memory 150 or the server 200 and the non-sharing layer group in the RAM 120.

Figure 11:
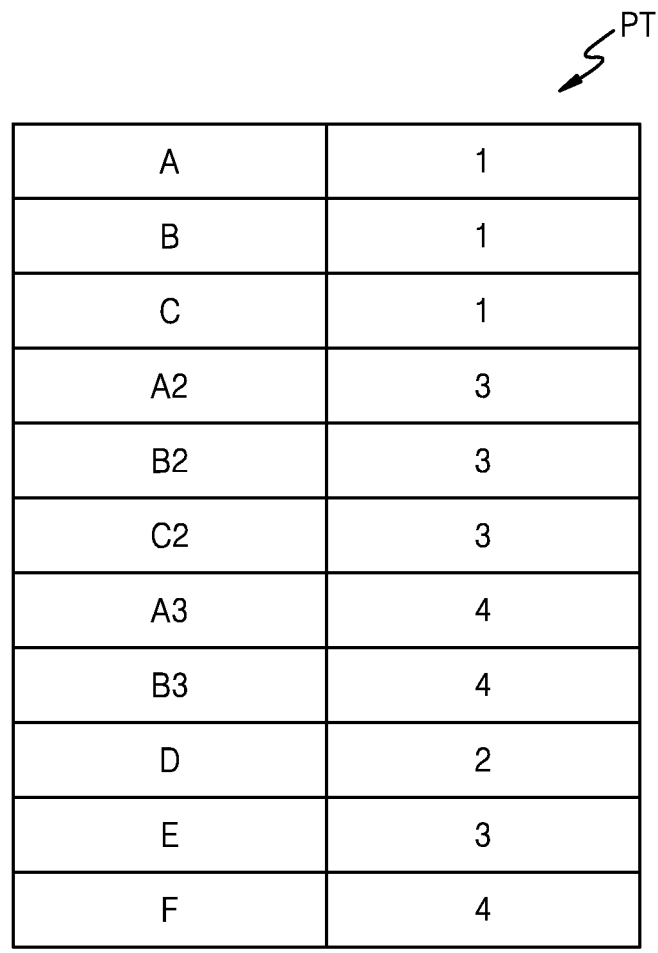
FIG. 11 is a diagram of a priority table according to an example embodiment.

FIG. 11 is a diagram of a priority table according to an example embodiment. In detail, FIG. 11 is a diagram of a priority table including information regarding a priority of each of the layer groups forming the neural networks.

When the neural network reconstruction operation of the neural network reconstruction module 140 of FIG. 2 is completed, a priority table PT, which includes information regarding a priority of each layer group forming the neural network, may be generated. The priorities of the layer groups may be determined based on whether the layer groups are included in the sharing layer group, the number of times the neural networks are operated, and the like. Priority determination criteria are not limited to the above examples, and the priorities may be determined based on various pieces of information. The electrical device 100 may update the priority table PT whenever a calculation using the neural network is performed to maintain the accuracy of the priority table PT.

The electrical device 100 may determine whether to release allocation of layers stored in the electrical device 100 based on the priority table PT. In an example embodiment, when it is determined that the storage space is insufficient, the electrical device 100 may release the allocation of layers having low priorities from among the layers already stored. The electrical device 100 may delete, from the priority table PT, the priority information corresponding to the layer group of which the allocation is released. When the layer group forming the neural network is stored in the external server (200 of FIG. 10) instead of the electrical device 100, the priority table PT may not include the priority information of the layer group stored in the server (200 of FIG. 10).

Figure 12:
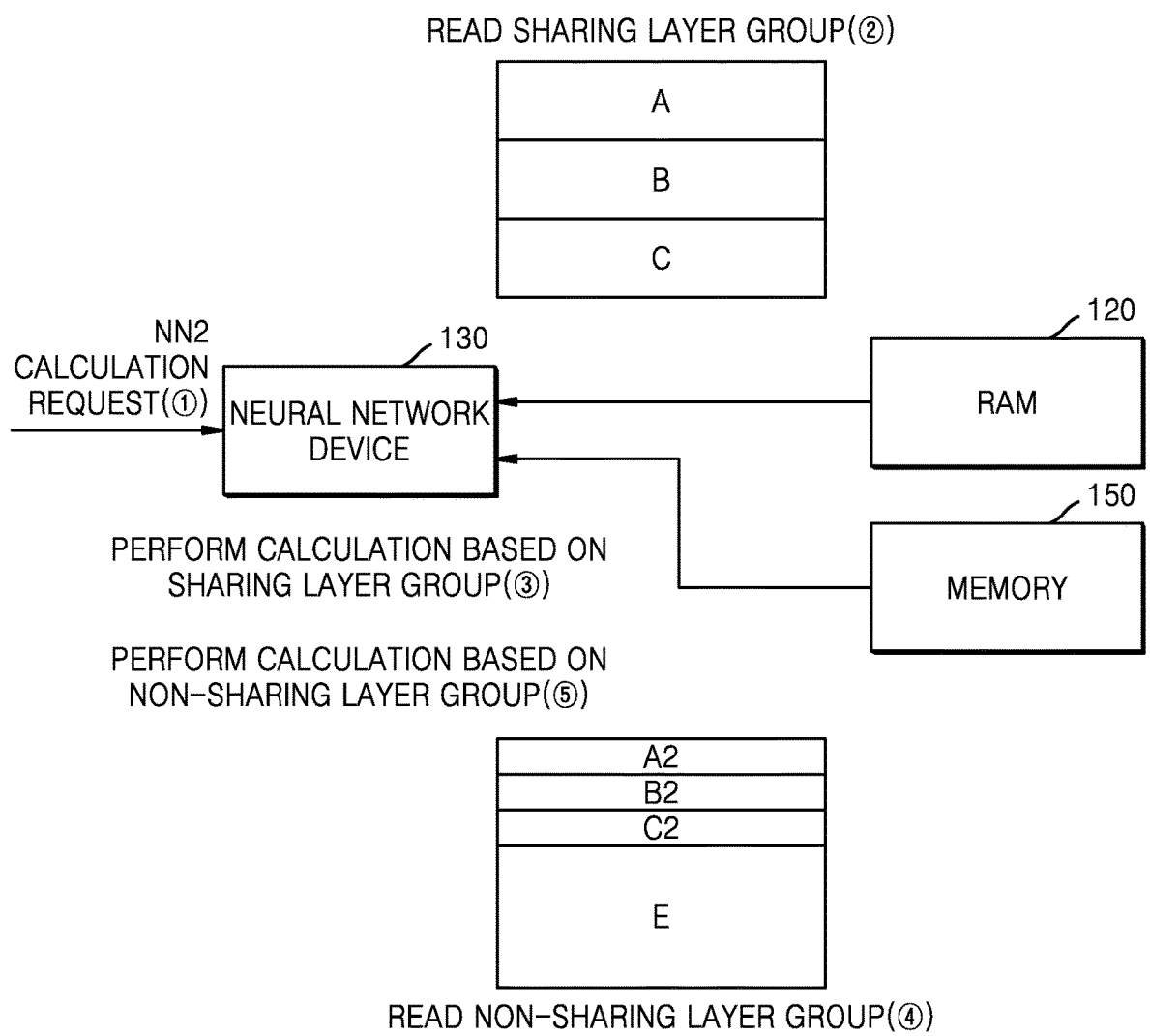
FIG. 12 is a diagram for explaining a calculation method using a neural network, according to an example embodiment.

FIG. 12 is a diagram for explaining an operation method using a neural network, according to an example embodiment. In detail, FIG. 12 is a diagram for explaining a method whereby the neural network device 130 of FIG. 2 performs an operation using the neural network.

The neural network device 130 of the electrical device 100 may receive a calculation request (①). For example, referring to FIG. 12, the neural network device 130 may receive the calculation request using the second neural network. The neural network device 130 may read the sharing layer group of the neural network from the RAM 120 in response to the calculation request (②). For example, referring to FIG. 12, the neural network device 130 may read the sharing layer group (the groups A, B, and C) of the second neural network from the RAM 120.

The neural network device 130 may perform the calculation based on the read sharing layer group (③). For example, referring to FIG. 12, the neural network device 130 may perform the calculation based on the read sharing layer group (the groups A, B, and C) of the second neural network. Referring to a structure of the reconstructed second neural network R_NN2 of FIG. 6, the group A may be used to perform a calculation on an initial input sample, and thus, the neural network device 130 may start a calculation by using the group A.

The neural network device 130 may perform the calculation using the sharing layer group and simultaneously read the non-sharing layer group from the memory 150 (④). For example, referring to FIG. 12, the neural network device 130 may read, from the memory 150, the read non-sharing layer group (the groups A2, B2, C2, and E) of the second neural network. The neural network device 130 may perform the calculation based on the read non-sharing layer group (⑤). For example, referring to FIG. 12, the neural network device 130 may sequentially perform the calculation according to a layer group order by using the sharing layer group (the groups A, B, and C) and the non-sharing group (the groups A2, B2, C2, and E).

FIG. 12 illustrates that the neural network device 130 reads the layer group forming the neural network from the RAM 120 or the memory 150, but according to an example embodiment, the neural network device 130 may be configured to receive the layer group from the external server (200 of FIG. 10).

Figure 13:
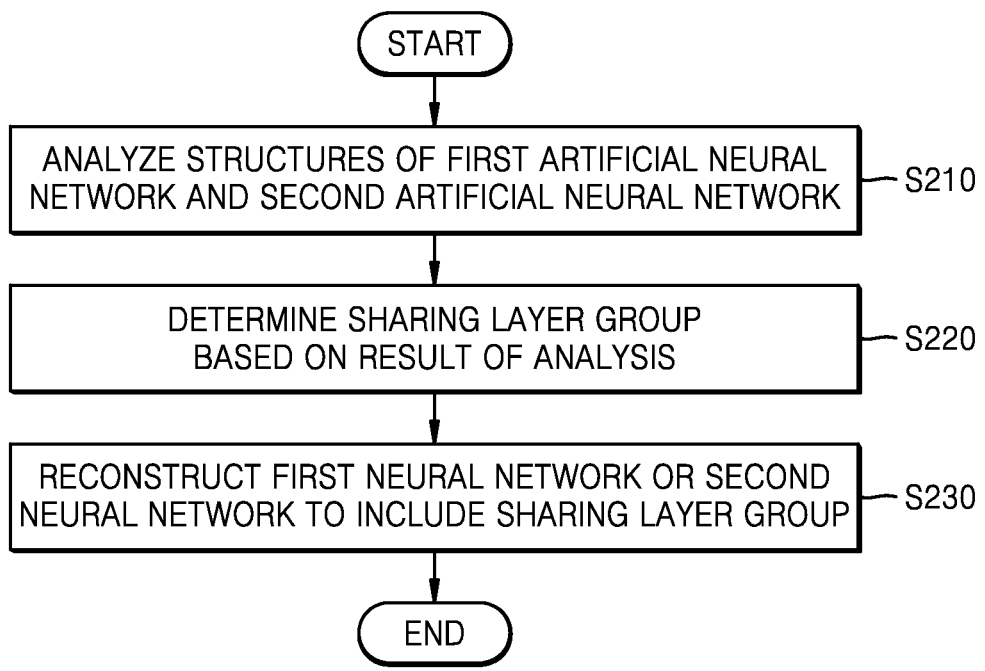
FIG. 13 is a flowchart of a method of reconstruction of an artificial neural network, according to an example embodiment.

FIG. 13 is a flowchart of a method of reconstruction of an ANN, according to an example embodiment. In detail, FIG. 13 is a flowchart of a method of reconstruction of the ANN of the electrical device 100 of FIG. 2.

Referring to FIGS. 2 and 13, the electrical device 100 may analyze the structures of the first neural network and the second neural network (S210). In an example embodiment, the electrical device 100 may identify the layers having structure similar to the structure of the reference neural network from among the layers forming the first and second neural networks, based on the reference neural network information and may determine the identified layers as one group. The reference neural network information may be information that may be referred to while a structure of a neural network is analyzed, and may include, for example, information regarding structures of neural networks that are frequently used or representative in the ANN. The electrical device 100 may determine the layer groups forming the first and second neural networks by repeatedly performing the above-described operations based on each reference neural network.

The electrical device 100 may determine similar layer groups from among the layer groups. In detail, the electrical device 100 may determine the similar layer groups from among the layer groups based on the reference neural network that is referenced while the layer groups of the first and second neural networks are determined.

The electrical device 100 may determine the sharing layer group based on a result of the analysis (S220). In an example embodiment, the electrical device 100 may determine one of the similar layer groups as the sharing layer group. For example, the electrical device 100 may determine, as the sharing layer group, a layer group that is the most similar to the reference neural network, a layer group that has the greatest performance, or a layer group that has high efficiency of the storage space from among the similar layer groups.

The electrical device 100 may reconstruct the first neural network or the second neural network to include the sharing layer group (S230). For example, when the sharing layer group is included in the first neural network, the electrical device 100 may replace a layer group, which is similar to the above sharing layer group from among the layer groups forming the second neural network, with the sharing layer group. The electrical device 100 may add a new layer in addition to the replaced layer group of the second neural network and may relearn a weight of the new layer to make a calculation result of the second neural network before the reconstruction be identical to a calculation result of the second neural network after the reconstruction. By contrast, when the sharing layer group is included in the second neural network, the electrical device 100 may perform a series of operations on the first neural network.

When the reconstruction operation on the first and second neural networks are completed, the electrical device 100 may store the layer groups forming the first neural network and the second neural network in the storage space. In this case, the sharing layer group that is included in both the first neural network and the second neural network may be stored only once. Also, the electrical device 100 may store the sharing layer group in the RAM 120 in which a reading operation is quickly performed, and may store the non-sharing layer group in the memory 150 in which a reading operation is relatively slowly performed.

As described above, an electrical device according to an example embodiment may reduce a storage space, where neural networks are stored, by reconstructing at least one neural network to make the neural networks include a sharing layer group and not by storing an layer group that overlaps. Also, the electrical device according to an example embodiment may store a sharing layer group in RAM, in which a reading operation is quickly performed, and thus may quickly start a calculation whichever neural networks are used. Also, the electrical device according to an example embodiment may prevent degradation in the accuracy according to reconstruction of a neural network by performing relearning of a neural network that is reconstructed to generate a calculation result that is identical to a calculation result of a neural network before the reconstruction.

Figure 14:
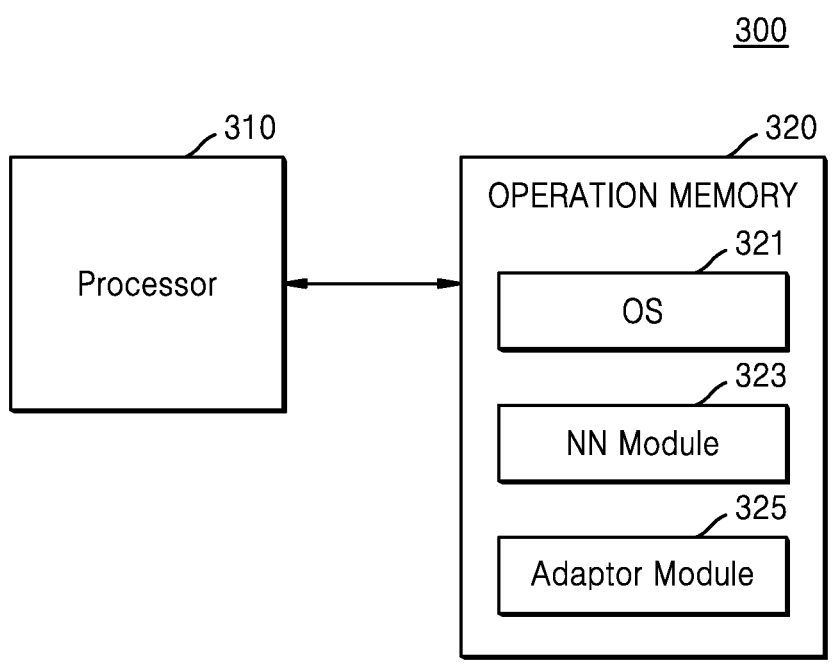
FIG. 14 is a block diagram of an example in which a neural reconstruction module is embodied as software that is executable by hardware components, according to an example embodiment.

FIG. 14 is a block diagram of an example in which a neural reconstruction module is embodied as software that is executable by hardware components, according to an example embodiment. A system of FIG. 14 may be an application processor 300, and the application processor 300 may be realized as a system on chip (SoC) as a semiconductor chip.

The application processor 300 may include a processor 310 and an operation memory 320. The application processor 300 may further include one or more intellectual property (IP) modules connected to a system bus. The operation memory 320 may store software such as programs and instructions associated with a system employing the application processor 300, and in an example embodiment, the operation memory 320 may include an operating system 321, a neural network module 323, and an adaptor module 325. The adaptor module 325 may perform a function of a neural network reconstruction module according to the above example embodiments.

The neural network module 323 may perform a calculation of an existing artificial neural network or an artificial neural network reconstructed according to example embodiments. Also, the adaptor module 325 may receive the artificial neural network and perform a neural network reconstruction module according to example embodiments. According to an example embodiment, the neural network module 323 may be realized in the operating system 321.

FIG. 14 illustrates one processor 310, but example embodiments are not limited thereto and the application processor 300 may include multiple processors. In this case, some of the processors may be general processors, and others thereof may be processors exclusively used to execute the artificial neural network. The adaptor module 325 may perform the neural network reconstruction operation based on static information and reference neural network information in relation to the exclusive processors.

While example embodiments have been particularly shown and described, it will be understood that various changes in form and details may be made therein without departing from the spirit and scope of the following claims.

What is claimed is:

1. An operation method of a processor configured to operate based on an artificial neural network comprising a first neural network and a second neural network, a Random Access Memory (RAM), and a non-volatile memory, the operation method comprising:
analyzing a structure of the first neural network and a structure of the second neural network with reference to a structure of a reference neural network to identify a first sharing layer group comprising one or more layers of the first neural network, and a second sharing layer group comprising one or more layers of the second neural network, wherein the first and second sharing layer groups correspond to layers of the reference neural network to be commonly used by the first and second neural networks, the first neural network comprising a plurality of first neural network layers and the second neural network comprising a plurality of second neural network layers, wherein the analyzing comprises analyzing, for each of the first neural network, the second neural network and the reference neural network, a number of layers, types of layers, a kernel size, a number of input samples, and a number of output samples;
selecting, from among the plurality of first neural network layers and the plurality of second neural network layers, sharing layers capable of being commonly used, based on a result of the analysis;
determining, one of the first sharing layer group or the second sharing layer group as a selected sharing layer group;
reconstructing the structure of the first neural network or the structure of the second neural network based on the selected sharing layer group, wherein the reconstructing of the structure of the first neural network or the structure of the second neural network further comprises adding the selected sharing layer group and a new layer to the first neural network or the second neural network, and wherein the new layer is used to correct a calculation result after adding the selected sharing layer group according to the reconstructing of the first neural network or the second neural network such that the calculation result after the reconstructing remains identical to the calculation result prior to the reconstructing; and
storing the sharing layers in the RAM, and remaining layers of the first neural network and the second neural network in the non-volatile memory.

2. The operation method of claim 1, wherein the analyzing comprises:
grouping the plurality of first neural network layers into first layer groups and grouping the plurality of second neural network layers into second layer groups.

3. The operation method of claim 2, wherein the grouping comprises:
searching the plurality of first neural network layers and the plurality of second neural network layers for layers having structure corresponding to the structure of the reference neural network; and
grouping the layers found from the search into the first layer groups or the second layer groups.

4. The operation method of claim 3, wherein the reference neural network comprises a plurality of reference neural networks, and
wherein the searching comprises repeatedly performing the searching based on each of the plurality of reference neural networks.

5. The operation method of claim 2, wherein the analyzing comprises searching for layer groups from among the first layer groups and the second layer groups that correspond to the structure of the reference neural network, and
wherein the selecting of the sharing layers comprises selecting, as the sharing layers, layers included in one of the layer groups found from the search.

6. The operation method of claim 5, wherein the searching comprises:
searching for layer groups that correspond to the reference neural network from among the first layer groups and the second layer groups; and
identifying the layer groups that correspond to the reference neural network, as the layer groups.

7. The operation method of claim 5, wherein the selecting of the sharing layers comprises selecting, as the sharing layers, layers included in a layer group having greatest storage efficiency or greatest performance from among the layer groups found from the search.

8. The operation method of claim 2, wherein the reconstructing of the structure of the first neural network or the structure of the second neural network comprises:
identifying a neural network, from among the first neural network and the second neural network, as a target neural network; and
replacing at least one of a plurality of target neural network layers of the target neural network with the sharing layers.

9. The operation method of claim 8, wherein the replacing with the sharing layers comprises:
searching for layers corresponding to the sharing layers from among the plurality of target neural network layers; and
replacing the layers found from the search with the sharing layers.

10. An electrical device comprising:
a memory comprising a Random Access Memory (RAM), and a non-volatile memory; and
a processor configured to control the electrical device to:
analyze a plurality of first neural network layers of a first neural network and a plurality of second neural network layers of a second neural network with reference to a reference neural network to identify a first sharing layer group comprising one or more layers of the first neural network, and a second sharing layer group comprising one or more layers of the second neural network, wherein the first and second sharing layer groups correspond to layers of the reference neural network to be commonly used by the first and second neural networks, based on, for each of the first neural network, the second neural network and the reference neural network, a number of layers, types of layers, a kernel size, a number of input samples, and a number of output samples;
identify the first sharing layer group as a selected sharing layer group, based on a result of the analysis;
generate a reconstructed second neural network by replacing the second sharing layer group of the second neural network with the first sharing layer group and adding a new layer to the second neural network, wherein the new layer is used to correct a calculation result of the reconstructed second neural network after adding the first sharing layer group such that the calculation result after the reconstructing remains identical to the calculation result prior to the reconstructing;
control the first sharing layer group to be stored in the RAM; and
control remaining layers of the first neural network to be stored in the non-volatile memory.

11. The electrical device of claim 10, wherein the processor is further configured to generate the reconstructed second neural network by replacing a third layer group of the second neural network with the first sharing layer group and adding at least one new layer.

12. The electrical device of claim 11, wherein the processor is further configured to learn the third layer group so the calculation result of the reconstructed second neural network remains identical to the calculation result prior to the reconstructing.

13. The electrical device of claim 11, wherein the processor is further configured to store the first neural network and the second neural network in a combination of the RAM and the non-volatile memory in layer group units.

14. The electrical device of claim 13, wherein the processor is further configured to store the third layer group in the non-volatile memory.

15. An electrical device comprising:
a Random Access Memory (RAM);
a non-volatile memory; and
a processor configured to control the electrical device to:
analyze a plurality of first neural network layers of a first neural network and a plurality of second neural network layers of a second neural network with reference to a reference neural network to identify a first sharing layer group comprising one or more layers of the first neural network, and a second sharing layer group comprising one or more layers of the second neural network, wherein the first and second sharing layer groups correspond to layers of the reference neural network to be commonly used by the first and second neural networks, based on, for each of the first neural network, the second neural network and the reference neural network, a number of layers, types of layers, a kernel size, a number of input samples, and a number of output samples;
identify the first sharing layer group as a selected sharing layer group, based on a result of the analysis;
generate a reconstructed second neural network by replacing the second sharing layer group of the second neural network with the first sharing layer group and adding a new layer to the second neural network, wherein the new layer is used to correct a calculation result of the reconstructed second neural network after adding the first sharing layer group such that the calculation result after the reconstructing remains identical to the calculation result prior to the reconstructing;

control the first sharing layer group to be stored in the RAM; and control remaining layer groups of the first neural network and the reconstructed second neural network to be stored in the non-volatile memory.

* * * * *